United States Patent
Li et al.

(10) Patent No.: US 8,077,640 B2
(45) Date of Patent: Dec. 13, 2011

(54) METHOD FOR SUPPORTING ASYMMETRIC SERVICE FLEXIBLE IN MULTI-CARRIER TIME DIVISION DUPLEX MOBILE COMMUNICATION SYSTEM

(75) Inventors: Shihe Li, Beijing (CN); Guiliang Yang, Beijing (CN); Jinling Hu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 1105 days.

(21) Appl. No.: 11/662,679

(22) PCT Filed: Sep. 12, 2005

(86) PCT No.: PCT/CN2005/001465
§ 371 (c)(1),
(2), (4) Date: Oct. 3, 2007

(87) PCT Pub. No.: WO2006/029567
PCT Pub. Date: Mar. 23, 2006

(65) Prior Publication Data
US 2008/0192660 A1    Aug. 14, 2008

(30) Foreign Application Priority Data
Sep. 13, 2004  (CN) .......................... 2004 1 0074682

(51) Int. Cl.
H04J 3/00      (2006.01)
H04B 7/212     (2006.01)
H04B 1/00      (2006.01)
H04B 1/04      (2006.01)

(52) U.S. Cl. ..... 370/280; 370/337; 455/63.1; 455/114.2

(58) Field of Classification Search ................... 370/280, 370/294, 337, 347, 395.21, 395.41
See application file for complete search history.

(56) References Cited

U.S. PATENT DOCUMENTS

| | | | |
|---|---|---|---|
| 6,963,544 B1 * | 11/2005 | Balachandran et al. | 370/281 |
| 7,116,682 B1 * | 10/2006 | Waclawsky et al. | 370/468 |
| 7,474,644 B2 * | 1/2009 | Pan et al. | 370/336 |
| 2002/0097689 A1 * | 7/2002 | Eloy et al. | 370/280 |
| 2003/0103445 A1 * | 6/2003 | Steer et al. | 370/208 |
| 2003/0214928 A1 * | 11/2003 | Chuah | 370/336 |
| 2005/0243745 A1 * | 11/2005 | Stanwood et al. | 370/280 |
| 2006/0077912 A1 * | 4/2006 | Cheng | 370/265 |
| 2009/0010228 A1 * | 1/2009 | Wang et al. | 370/335 |

FOREIGN PATENT DOCUMENTS

| | | |
|---|---|---|
| CN | 1233117 | 10/1999 |
| CN | 1497881 | 5/2004 |
| KR | 2002-0062815 | 7/2002 |
| WO | WO 2004/032372 | * 4/2004 |

* cited by examiner

Primary Examiner — Thai Hoang
(74) Attorney, Agent, or Firm — Merchant & Gould P.C.

(57) ABSTRACT

A method to support dissymmetry service for multicarrier time division duplexing mobile communication system, which contains adopting different uplink and downlink time gap conversion point to support dissymmetry service among multicarrier frequency of different cells and same cell, when the original configured uplink and downlink time gap ratio can not support the service request, then changing the time gap ratio to receiving said request, adjusting service to avoid interference by quick dynamic channel distribution technology, in ending request service, changing time gap ratio in original ratio. Said invention supports different uplink and downlink time gap conversion point, the base station equipment needs establishing isolated uplink and downlink.

15 Claims, 7 Drawing Sheets

Prior Art

Fig. 1

Prior Art

Prior Art

METHOD FOR SUPPORTING ASYMMETRIC SERVICE FLEXIBLE IN MULTI-CARRIER TIME DIVISION DUPLEX MOBILE COMMUNICATION SYSTEM

FIELD

The present invention relates generally to Time Division Duplex Mobile Communication Technology, and more specifically to a method for supporting asymmetric service flexibly in Multi-carrier Time Division Duplex Mobile Communication System with different carriers of cells or base stations using different switching point between downlink and uplink.

BACKGROUND

In the current standard for the time division duplex (TDD) communication method for mobile communication of the third generation (refers to the technical standards related to 3GPP), only the method for operation with single carrier is defined. The base station should be designed to be able to operate with multiple carriers in order to satisfy the communication need under the environment of applications of high density, however. In the "multi-carrier time division duplex mobile communication system" designed based on such a thought, the radio base station operates with multiple carriers, and multiple carriers, such as with three frequencies of f0, f1 and f2, may be used within one cell to increase the capacity of the cell, or more specifically, to increase the capacity of the system while lowering the cost of the system, and simplify the design of the system so that the system will be controlled and managed more easily, and the efficiency of the system will be increased.

However, only one set (or group) of radio transmitter/receiver is commonly used in one base station, under which condition all the carrier frequencies should be transmitted or received simultaneously when the base station operates with multiple carriers, otherwise, severe interference occurs inside the base station, which may cause transmitting or receiving failures in the system.

And when the cellular mobile communication system is constituted with conventional TDD system, when the same carrier frequency is used in adjacent cells, such adjacent cells must operate in sync, i.e., transmit the downlink signal simultaneously and receive the uplink signal simultaneously, according to the basic requirements of the CDMA mobile communication system, when the system is being scheduled by the operator, otherwise, interference occur between the base stations within the communication system.

The possibility for TDD system to support asymmetric services where different uplink and downlink ratios are used in adjacent cells is greatly constrained by the existence of above problems, or in other words, some system capacity must be sacrificed if asymmetric services where different uplink and downlink ratios are used in adjacent cells are supported.

Figure 1:
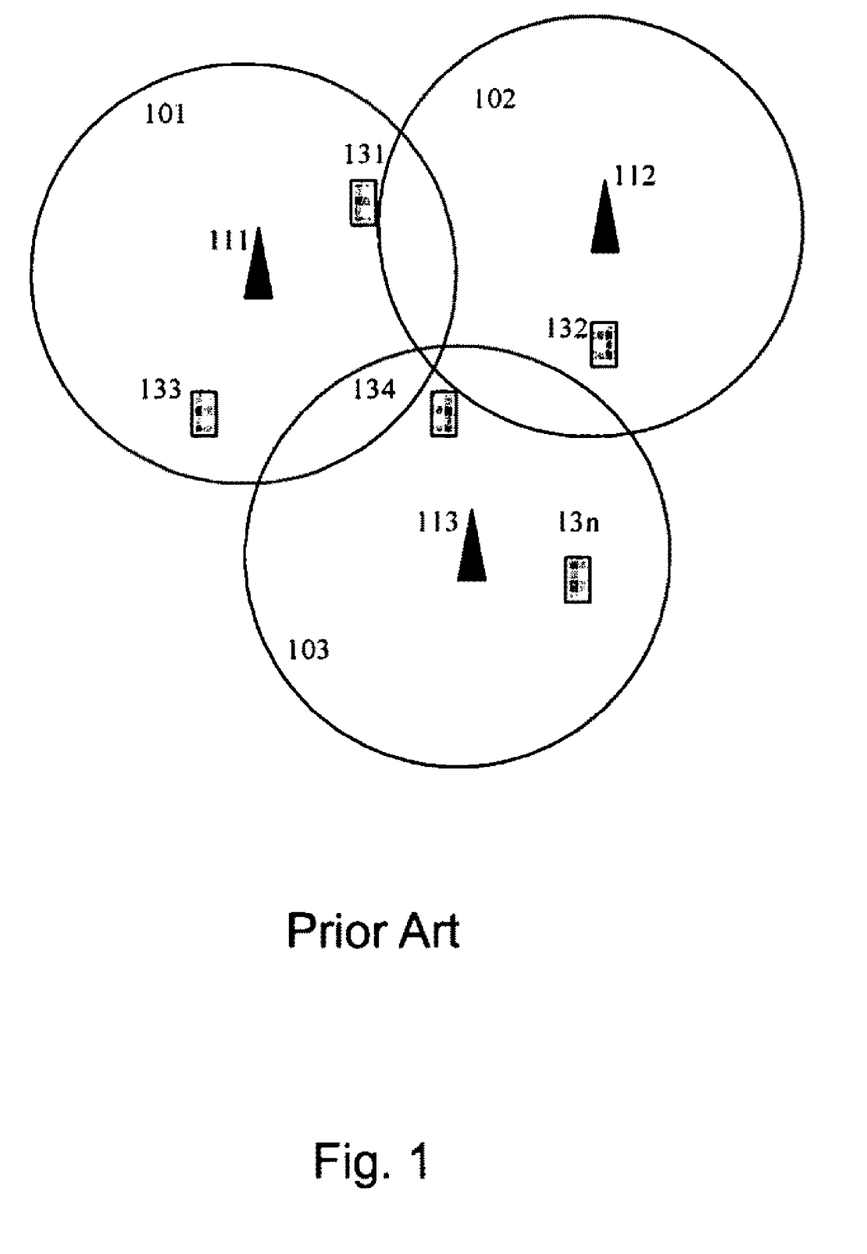
FIG. 1 is a schematic view showing the operation state of the base stations in a TDD system using multi-carrier according to the present 3GPP standard.

FIG. 1 is a schematic view showing the operation state of multi-carrier base stations in a typical TDD cell mobile communication system wherein the 3GPP standard is performed. Three cells 101, 102, and 103 are shown in FIG. 1, wherein a single carrier frequency or multiple carrier frequencies, such as three carrier frequencies f0, f1 and f2, which are the same among the cells are used by the base station 111, 112, and 113 of respective cells, and a plurality of terminals in operation exist in respective cells. In the present normal operation state, the switching between transmission and receiving must be performed at the same time for all three carrier frequencies of respective cells, i.e., the downlink transmission or the uplink receiving must be performed at the same time for all the carrier frequencies of the base stations in respective cells, whereby the interference between respective frequencies during the overlapping time slot between the uplink and downlink can be avoided. The adjacent cells should also be coordinated to adapt the same switching time (at the same switching point) between uplink and downlink, and if different switching times are used in respective cells, for example, different switching times between uplink and downlink t1, t2, and t3 are adapted for three carriers f0, f1 and f2 in the base station 111, 112, and 113 of respective cells, interference will be caused during the overlapping time slot between the uplink and downlink.

Figure 2:
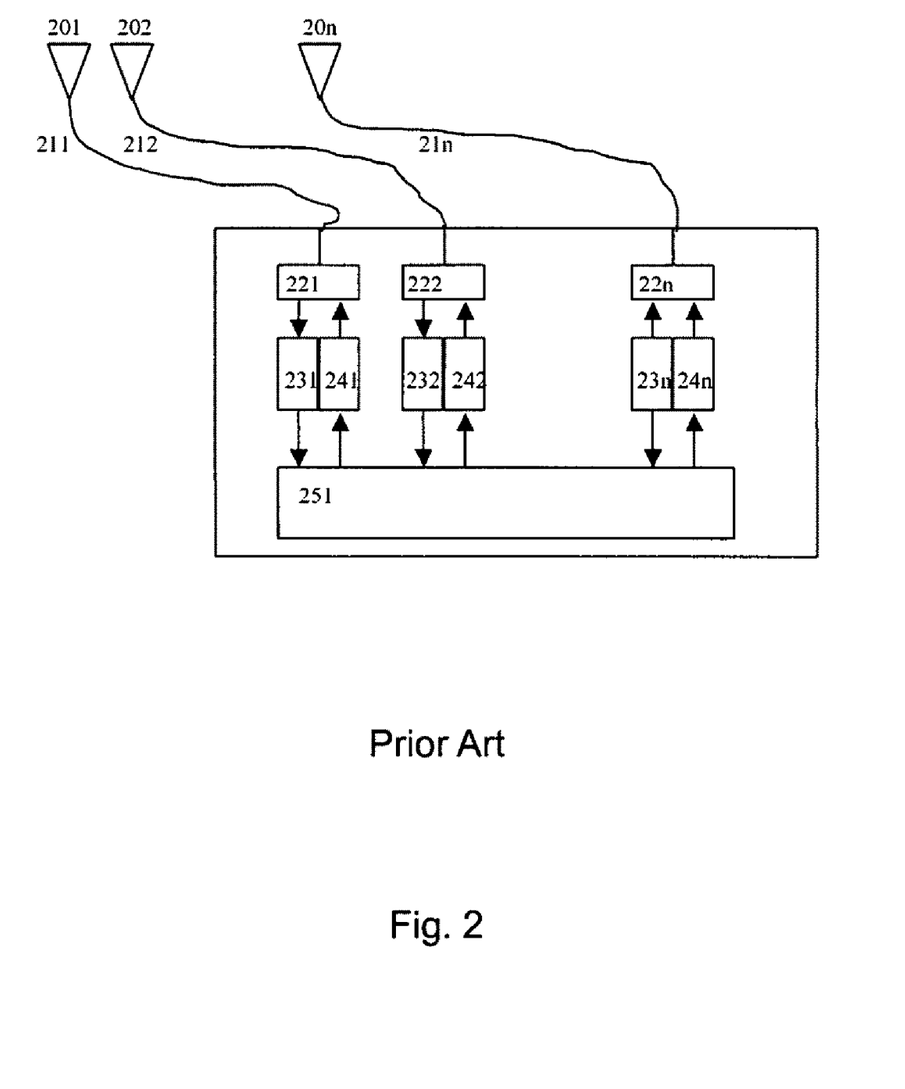
FIG. 2 is a schematic diagram showing the typical structure of a base station in present TDD systems.

FIG. 2 schematically shows the conventional structure design of a base station in the TDD system which includes a radio transmitter/receiver and an antenna system. Normally, the antenna system comprises n antennae 201, 202, ..., 20n, and n feeding cables 211, 212, ..., 21n corresponding to the n antennae 201, 202, ..., 20n, respectively. The n antennae are connected to n radio receivers 231, 232, ..., 23n and n radio transmitters 241, 242, ..., 24n on desks in the room via the n feeding cables respectively, which are connected to the baseband signal processing unit 251. In TDD systems, the switching between transmitting and receiving is performed through elements 221, 222, ..., 22n, such as radio switches or circulators, i.e., a set of antenna and feed line may corresponds to a set of radio receiver/transmitter.

Figure 3:
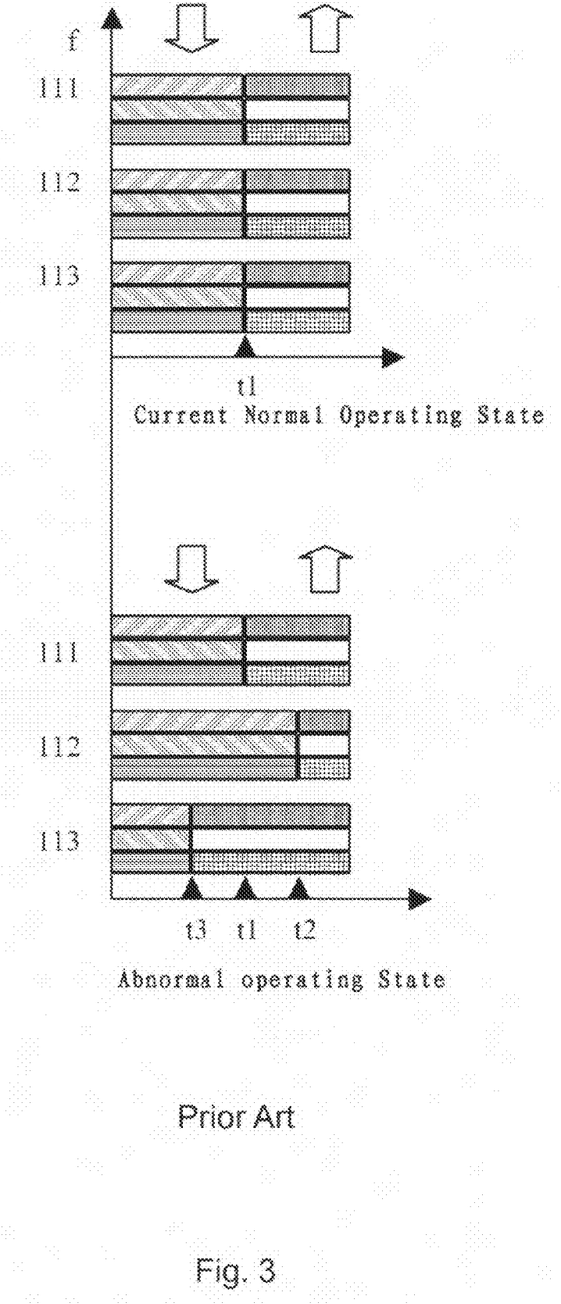
FIG. 3 is a schematic view showing the normal operation state of a base station in a TDD system using multi-carrier according to the 3GPP standard with the switching between uplink and downlink at the same time and the abnormal operation state thereof with the switching between uplink and downlink not at the same time.

The normal operation state in which the same switching time between uplink and downlink are used for respective carrier waves in respective cells and the abnormal operation state in which different switching times between uplink and downlink are used for respective carrier waves in respective cells will be explained with reference to FIG. 3. The downlink f0, f1, and f2 are represented by rectangles with horizontal line patterns, right slanting line patterns, left slanting line patterns respectively, and the uplink f0, f1, and f2 are represented by rectangles with small square patterns, blank patterns and grey patterns respectively. As for the example shown in FIG. 1, the same switching time t1 is used for respective carrier frequencies f0, f1 and f2 in the base stations 111, 112 and 113 in normal operation state, all the carrier frequencies f0, f1 and f2 are used for downlink before time t1, and switched to be used for uplink at the same time t1. However, if different switching times between uplink and downlink are used in respective base stations of each cell, interference will occur irrespective of whether smart antenna or group division transmission or group division receiving are adapted in respective base station of each cell, for example, if switching time t1 between uplink and downlink is used for the carrier frequencies f0, f1 and f2 in the base stations 111, while switching time t2 between uplink and downlink is used for the carrier frequencies f0, f1 and f2 in the base stations 112, and switching time t3 between uplink and downlink is used for the carrier frequencies f0, f1 and f2 in the base stations 113, the uplink of base station 111 will be strongly interfered by the downlink of the base station 112 during the time period from t1 to t2 where the downlink and the uplink overlaps, and the uplink of base station 113 will be strongly interfered by the downlink of the base station 112 during the time period from t2 to t3 where the downlink and the uplink overlaps, and the uplink of base station 113 will be strongly interfered by the downlink of the base station 111 during the time period from t3 to t1 where the downlink and the uplink overlaps. Since the antennae of the base station are normally quite high and the transmission power thereof are much higher than user terminals, the base station is not able to receive the signal from the terminal correctly during the time period where the above interference occurs such that normal communication cannot be performed during these time period.

In a TDD base station using multiple carriers, if different switching times between uplink and downlink are adapted for each carrier, and if the above mentioned problem of interference caused by different switching times between uplink and downlink used for multiple carriers in multiple base stations of multiple cells are resolved by radio resource control technology, the flexibility of the system can be increased by means of smart antenna technology.

However, it is not possible for the conventional TDD base station to operate like this, since each set of radio receiver/transmitter supports multiple carriers and the same switches or circulators $221, 222, \ldots, 22n$ are used for each set of radio receiver/transmitter to switch between uplink and downlink and to use the same antenna and feeding cable system.

An obvious technical advantage of TD-SCDMA system which is one of the standards of the third generation mobile communication system is the ability of supporting asymmetric services. However, in conventional base stations using multiple carriers, since the same receiver/transmitter is used for multiple carriers, the switching between uplink and downlink thereof must be performed at the same time, and if the same carrier frequency is used in adjacent cells in the scheduled region, which is a basic requirement of the CDMA system, frame synchronization are usually required and the configuration of the same uplink and downlink ratio is adapted to avoid interference between adjacent cells to the most extent, the flexibility for the system to support asymmetric uplink and downlink service is constrained.

SUMMARY

The object of the present invention is to provide a method for supporting asymmetric service flexibly in multi-carrier time division duplex mobile communication system, which makes it possible for different switching points between uplink and downlink to be used for different operating carriers in respective cells or base stations and for different switching points between uplink and downlink to be used in adjacent cells, in other words, to provide a method for supporting asymmetric services with different switching point between uplink and downlink being used for different carriers in the same base station or with different switching point between uplink and downlink being used for the same carriers or different carriers in different base stations.

A technical solution by which the object of the present invention is achieved is as follows: a method for supporting asymmetric service flexibly in a multi-carrier time division duplex mobile communication system, configured to support asymmetric services with different switching points between downlink and uplink slots on a plurality of carrier frequencies in adjacent cells and a plurality of carrier frequencies in a same cell, said method comprising:

A. When a ratio between uplink and downlink service slots required by an asymmetric service requested by a request is unable to be supported by a ratio between uplink and downlink service slots initially set for one carrier frequency, determining whether the request is able to be accepted by changing the ratio between uplink and downlink service slots for the carrier frequency, this step A further including: A1. selecting one carrier frequency having sufficient remaining resources in the cell where said request is being made; A2. determining services carried on other carrier frequencies in the cell and services carried on all the carrier frequencies in adjacent cells that will be interfered when the uplink and downlink slots arrangement for the carrier frequency is changed by analysis; A3. avoiding interference by adjusting the services that are determined to be interfered into other slots on its operating carrier frequency or the other carrier frequencies that will not be interfered by rapid DCA technology; A4. determining whether steps A1 to A3 can be executed successfully, and if yes, deciding said request is able to be accepted by changing the ratio between uplink and downlink service slots for the carrier frequency.

B. If the request is able to be accepted by changing the ratio between uplink and downlink service slots for the carrier frequency, accepting said request by changing the ratio between uplink and downlink service slots for the carrier frequency, and otherwise, rejecting said request;

C. Receiving uplink radio frequency signals in a uplink constituted by separate receiving antennae, feeding cables and receivers, and transmitting downlink radio frequency signals in a downlink constituted by separate transmitting antennae, feeding cables and transmitters;

D. Changing the ratio between uplink and downlink service slots for the carrier frequency back to the ratio initially set when completing the requested asymmetric service.

In said step A, the condition that the ratio between uplink and downlink service slots required by an asymmetric service requested by a request is unable to be supported by the ratio between uplink and downlink service slots initially set for one carrier frequency includes: one of conditions that a data transmission rate required by the requested service exceeds a maximum data transmission rate available in uplink or downlink of the initial setting, and remaining resources after carrying the services under initial setting is insufficient to carry the requested service.

Said determining by analysis in step A2 is to examine whether in a direction of shaped wave packet of a user making the request, there are said other carrier frequencies or said adjacent cells receiving signals from terminals in the direction of the shaped wave packet during slots more than the originally allotted slots; or examine whether there are said other carrier frequencies or said adjacent cells transmitting signals to terminals in the direction of the shaped wave packet during slots fewer than the originally allotted slots.

Said examining further comprises: the RNC performing management on wireless resources by referring to the database of the operating state of the system according to direction of the incoming wave packet of the user making the calling request and width of the shaped wave packet, wherein the database records and updates the state of each operating terminal within the management range of the RNC in real time, which includes the wireless resources allotted with carrier frequency, slots and code channel, the carried services, measured data obtained by routine measurement in accordance with communication standard, and position information of the terminals including distance and direction of the terminals with respect to base stations, and data regarding relative positions of cell antennae within management range and regarding width of the shaped wave packets of each cell antenna.

Also, said step A3 is to determine whether the interference is able to be avoided by referring to the database of the system operating state and performing management on wireless resources by the RNC according to the direction of the incoming wave packet of the user making the calling request and the width of the shaped wave packet.

It is proposed in the present invention a design method by which different switching point between uplink and downlink can be used on different carriers and different base stations to support asymmetric services with different ratios of resources used by uplink and downlink.

It is disclosed in the present invention taking TD-SCDMA system as an example that in an TDD system with smart antennae, it is possible to avoid the interference introduced by the using of different switching points between uplink and downlink by setting up a system operating state database in the RNC in which the data regarding all the operating terminals is recorded, and by analyzing the direction of the shaped wave packet of the smart antenna and determine the cells, carrier frequencies that will be interfered when the switching point between uplink and downlink is changed when the present slot ratio between uplink and downlink needs to be adjusted to support the asymmetric service requested by the user, and avoiding the interference by rapid DCA.

It is proposed in the present invention that in a TDD mobile communication system, in which the base stations use multi-carrier, different switching points between uplink and downlink can be used on different carrier frequencies in the same cell or the adjacent cells to flexibly supporting the asymmetric service. Wave packet shaping antennae are adapted in base stations by which the position of the terminals can be traced, whereby it is possible for the RNC to perform analysis on the interference that will be introduced when different switching points between uplink and downlink are used in accordance with the information regarding positions of user terminals and the width of the shaped wave packet. It is possible to avoid the interference by means of DCA technology in accordance with the result of the above analysis when supporting various asymmetric services flexibly, i.e., adjust the services that will be interfered to other slots on the operating carrier frequencies or the other carrier frequencies that will not be interfered, to improve the efficiency and capacity of the system.

The base station used in the present invention must use antennae and feeding cables with enough isolation for receiving and transmission respectively, and the receiver and the transmitter must be able to be controlled separately and have enough isolation in order to support above flexible configuration.

It has been disclosed in the present invention a design method for supporting asymmetric services with different ratios between uplink and downlink in a TDD multi-carrier mobile communication system. The essential part of the present invention is to avoid interference on the basis of sufficient analysis in accordance with the related measured information, utilizing advanced management and control on radio resources and wave packet shaping method with smart antenna, such that the switching points between uplink and downlink can be configured flexibly for multiple carriers of the base station and multiple carriers of the adjacent cells, whereby asymmetric services with different ratios between uplink and downlink can be supported flexibly and the efficiency in the allotment of the resources of the system can be improved, which represents the feature of the TDD system of supporting asymmetric services.

As compared to the standard TD-SCDMA system, the multi-carrier TD-SCDMA system in which the method in accordance with the present invention is implemented is able to reduce the interference within the system to a large extent, and solves the technical problem that asymmetric services are supported flexibly by adapting different switching point between uplink and downlink in the same cell or the adjacent cells, whereby the efficiency and the capacity of the system is improved while no extra cost and complexness is added.

DETAILED DESCRIPTION

The method of the present invention is described in detail below taking TD-SCDMA system as an example, which is a radio resource allotting method having the benefit of avoiding interference and improve the efficiency of the system as much as possible when different carriers and different switching points are used in the operation of multi-carrier base stations in TDD system to support asymmetric services.

The essential part of the present invention is to make it possible for the switching time between uplink and downlink of one of the multiple carriers different from the switching time between uplink and downlink of the others of the multiple carriers in a multi-carrier TDD mobile communication system.

Sectors with multiple carriers and the same or almost the same covering areas are treated as one cell in the multi-carrier TDD mobile communication system. In such a cell, one carrier is chosen as the primary carrier, and all the common channels, such as the DwPTS, BHS, PCH, FACH, RACH, are arranged on the primary carrier. The remaining resources (slots and code channels) on the primary carrier and all the resources (slots and code channels) on the other carriers are used for transferring services.

The switching times between uplink and downlink for different carriers are determined based on the requirement of the asymmetric services.

Figure 4:
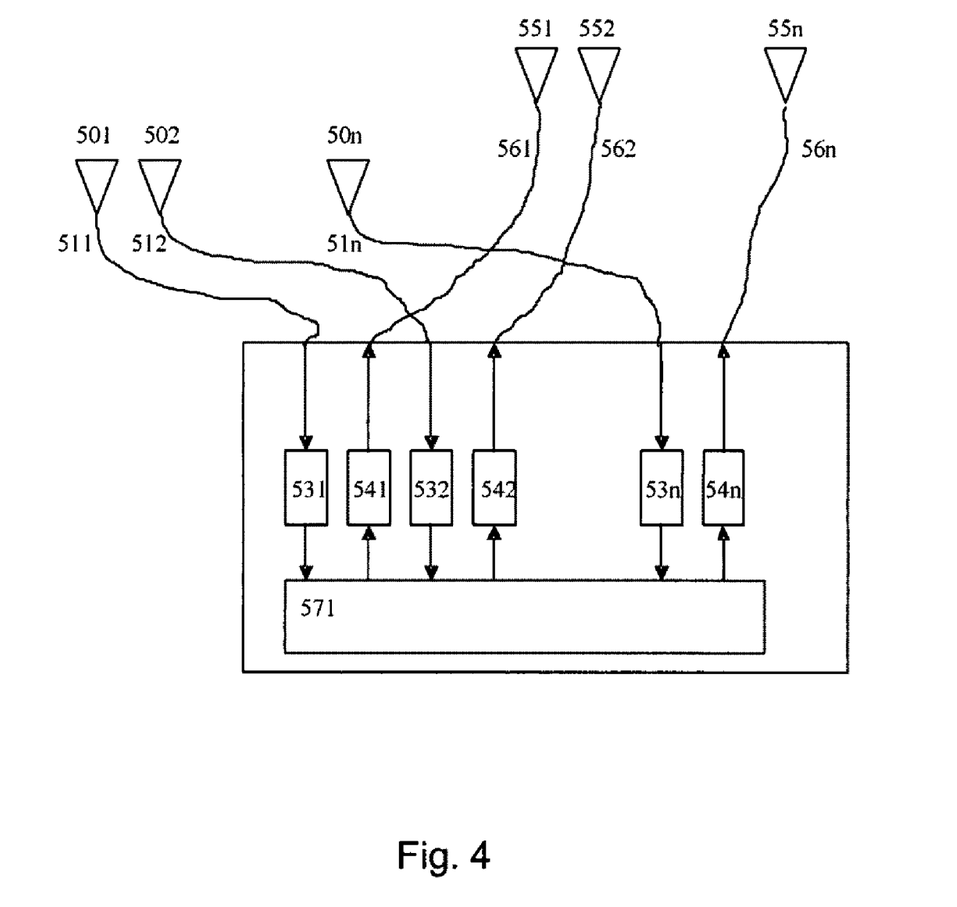
FIG. 4 is a schematic diagram showing the structure of a base station in TD-SCDMA systems using multi-carrier in which the method according to the present invention is supported.

Modifications to the present base stations are needed to support asymmetric services with different uplink/downlink ratio, where different switching times between uplink and downlink are used for different carriers. The basic structure of a base station in accordance with the present invention is shown in FIG. 4.

The antennae array for receiving comprises antenna unit 501, 502, . . . , 50*n*, which are connected to receiver 531, 532, . . . , 53*n*, respectively, via receiving feeding cables 511, 512, ..., 51n; the antennae array for transmission comprises antenna unit 551, 552, ..., 55n, which are connected to transmitter 541, 542, ..., 54n, respectively, via receiving feeding cables 561, 562, ..., 56n. A baseband signal processing unit 571 is also in the FIG. This structure is different from the basic structure of conventional TDD base stations (see FIG. 2) in that no radio switches or circulators are needed and respective antennae are used for receiving and transmitting, which are connected to the receivers and transmitters respectively.

Exactly the same frequencies are used on each carrier to perform receiving and transmission. In practice engineering, multiple carriers operate on adjacent frequencies, and the interference between adjacent carriers in the base station must be avoided when the switching times between uplink and downlink are different for each carrier, that is to say, the leakage from the transmitter to the receiver must be kept to an extremely low level inside the base station, or, the isolation between them must be higher than 60 dB (such as between 60 dB and 80 dB). In addition, the isolation between the receiving antenna and the transmission antenna should also be enough high (such as higher than 60 dB). The later will be achieved by antenna (array) design and engineering installation.

Figure 5:
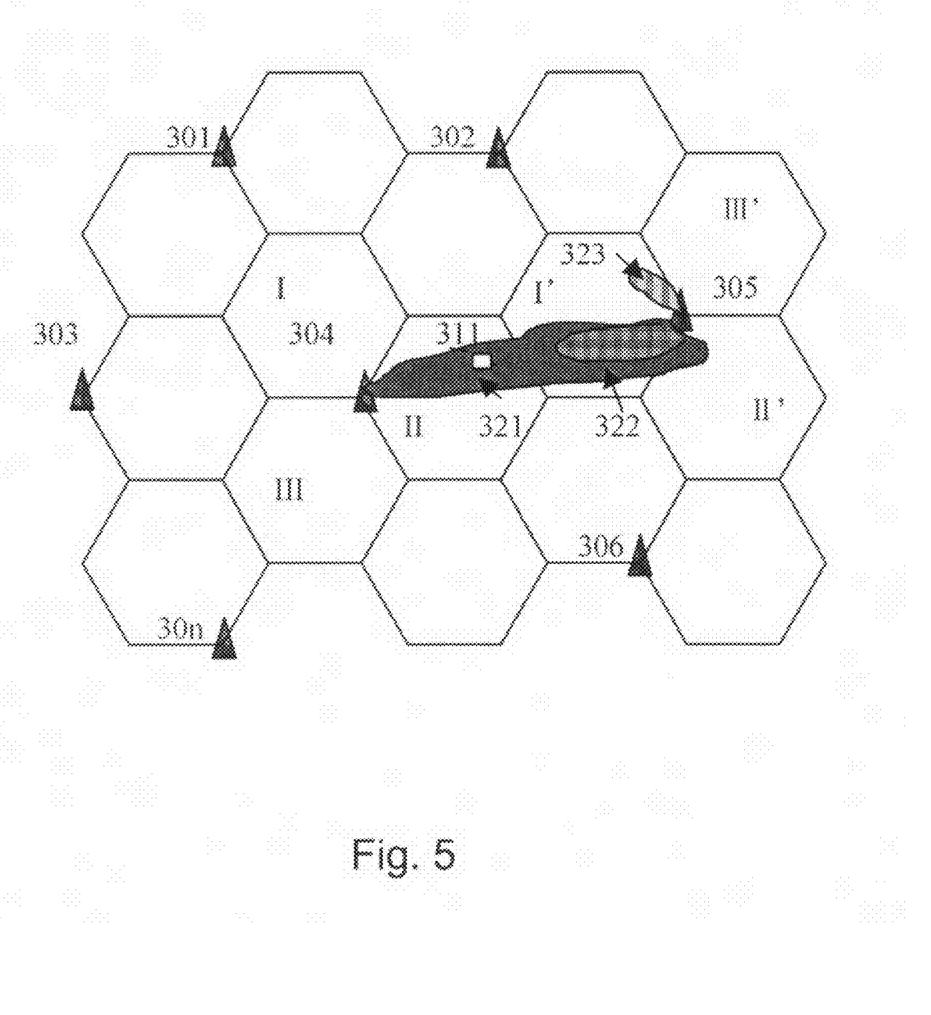
FIG. 5 is a schematic view of the interference direction of a TDD system with smart antenna.

Refer to FIG. 5 now, where the interference condition of the TDD system with smart antenna is schematically shown.

Smart antennae are used in the base station of the TD-SCDMA system, which use shaped wave packet to perform receiving and transmission, where the energy density of the signal outside the shaped wave packet is 10 times lower or tens of times lower than that inside the shaped wave packet.

A TDD cell mobile communication network with smart antennae as shown in FIG. 5 comprises n base stations, each of which use 3 sectors to cover the antenna, i.e., each of the base stations can be regarded as covering 3 cells. The base station 304 as shown in the Fig covers 3 cells I, II, and III, while the base station 305 covers 3 cells I', II', and II'. The shaped wave packet of base station 304 for receiving and transmitting may be 321 when the base station 304 communicates with terminal 311 in the second sector II thereof, which has its main ( ) wave packet of about 150 wide. Since the antenna of the base station is normally set quite high, and the gain of the antenna is also quite high, the carrier frequencies which direct to the same direction as the wave packet 321 may be interfered, while the other carrier frequencies or cells have very little possibility to be interfered. Only when the shaped wave packet of the cells or carrier frequencies directs to the shaped wave packet, such as wave packet 322, and there exist overlapping time slots (see FIG. 3), the interference will occur. On the other side, when the shaped wave packet of the cells or carrier frequencies directs to other directions, such as wave packet 323, the interference will be little and has almost no influence on communication.

Since the shaped wave packet will change its direction to follow the user terminal as the user terminal moves, the base stations (or cells) which will be interfered will also change. Accordingly, a system operation state database is required to be set at the radio network controller (RNC) side, to record the state of each operating terminal within the range of management in real time, which include the radio resources allotted (such as the carrier frequency, slots and code channel), the services carried, data required to be routinely measured in accordance with the communication standard and the position of the terminal (distance and direction with respect to the base station, or the direction of its wave packet reaching the base station) or the like.

In order to avoid the interference between the base stations, the RNC is required to record and update the data regarding the relative positions of all the cell antennae within the range of management and the width of the shaped wave packet of each cell antenna, based on which the radio resource management (RRM) is performed.

The flexible supporting for asymmetric services is explained below taking the TD-SCDMA multi-carrier system as an example.

Figure 6A:
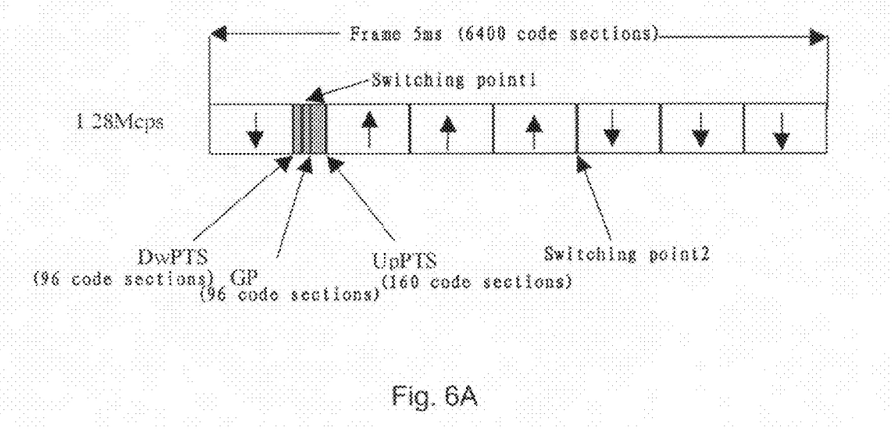
FIG. 6A and FIG. 6B are a schematic views showing the original configuration and modified configuration of the uplink and downlink slots in accordance with TD-SCDMA standard.

First, the allotment schedule for uplink and downlink slot is set according to the estimate of the service amount for uplink and downlink at the phase of building the network. Carrier frequencies f0, f1, and f2 are used in the sector II of the base station 304, while the same carrier frequencies f0, f1, and f2 are also used in the sector I' of the adjacent base station 305. The original time slot arrangement of the carrier frequencies f0, f1, and f2 of the sector II and the sector I' are shown in FIG. 6A, where 3 uplink slots and 3 downlink slots are arranged before and after the switching point 2. When the terminal user 311 make a call in the sector II of the base station 304 to apply for the high speed download services with the supports of 4 download time slots, none of the carriers is able to support this user request according to the current slot arrangement schedule, and the access request will be rejected without the support of the method in accordance with the present invention. However, if the method in accordance with the present invention is adapted, the user request can be supported by changing the arrangement of the slots.

Figure 6B:
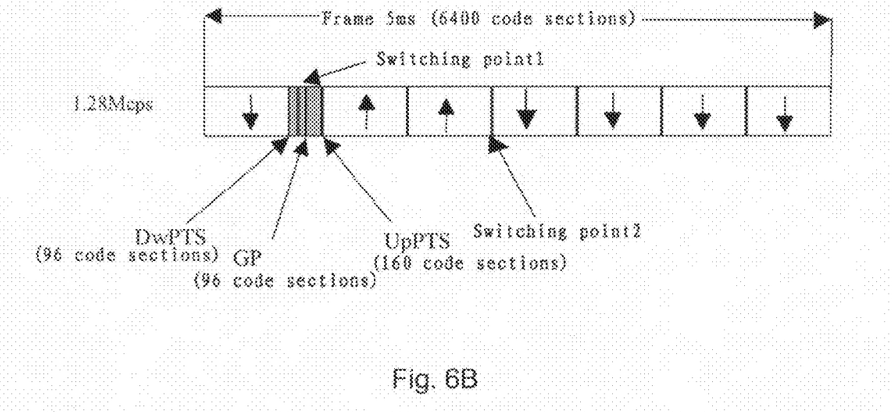

The process for supporting the request of the user is as follows: carrier frequencies with lower load are chosen, for example, suppose that there is no load on carrier frequency f1 (or few loads), f1 is chosen;

Since the downlink resources are limited, while there are remaining resources for uplink, the arrangement for uplink and downlink may be changed to support the request of the user, for example, the slot arrangement for f1 may be changed to the arrangement as shown in FIG. 6B;

Then, the influence on carrier frequencies f0, f2 of the same cell and all the carrier frequencies of the adjacent cells within the direction the shaped wave packet directs, such as influence on the frequencies f0, f1, and f2 of the sector I' of the base station 305, is further determined. Since smart antennae are adapted to shape the wave packet, the direction of the shaped wave packet directs to user 311 can be determined to be 321, and only the other users in the direction 321 of the shaped wave packet will be interfered. According to the explanation regarding the interference, it should be understood that as for the carrier frequencies f0, f2 of the same cell and the frequencies f0, f1, and f2 of the sector I' of the base station 305 in the direction of the shaped wave packet directs to user 311, only the users operating at the uplink slot before the switching point 2 in FIG. 6A will be interfered. The RNC, operating as a center for the control of the radio resources management, records the state of the usage of the current radio resources, and the operating state of the users in the direction of the shaped wave packet and the time slots where the interference may occur can be obtained by reference to the database. For example, if there is one user 322 transmitting uplink signal on carrier f1 in the sector I' of the base station 305 in this time slot, the uplink signal will be influenced by the strong downlink signal of the user 321.

When it is determined that the interference will occur, the users in the direction 322 may be adjusted to the other slot on the carrier frequency f1 or the uplink slots on the other carrier frequencies f0, f2 that will not be interfered (i.e., the other uplink slots on the carrier frequencies f0, f1 and f2) by rapid DCA technology, to avoid the interference.

If the interference can be avoided successfully, the slot arrangement of the carrier frequency f1 of the sector II of the base station 304 can be changed as shown in FIG. 6B, to support the request of the user 311 for high speed download services.

When the service for the user 311 is completed, the original slot arrangement as shown in FIG. 6A can be restored.

Since the interference only occurs in specific direction and limited range of time, the possibility for failure in avoiding the interference by DCA is quite low. However, if the interference cannot be successfully avoided, the request of the user 311 for high speed download services will be rejected. As described above, the efficiency of the usage of the resources can be improved efficiently in accordance with the method of the present invention, and flexible support for asymmetric services can be realized.

Figure 7:
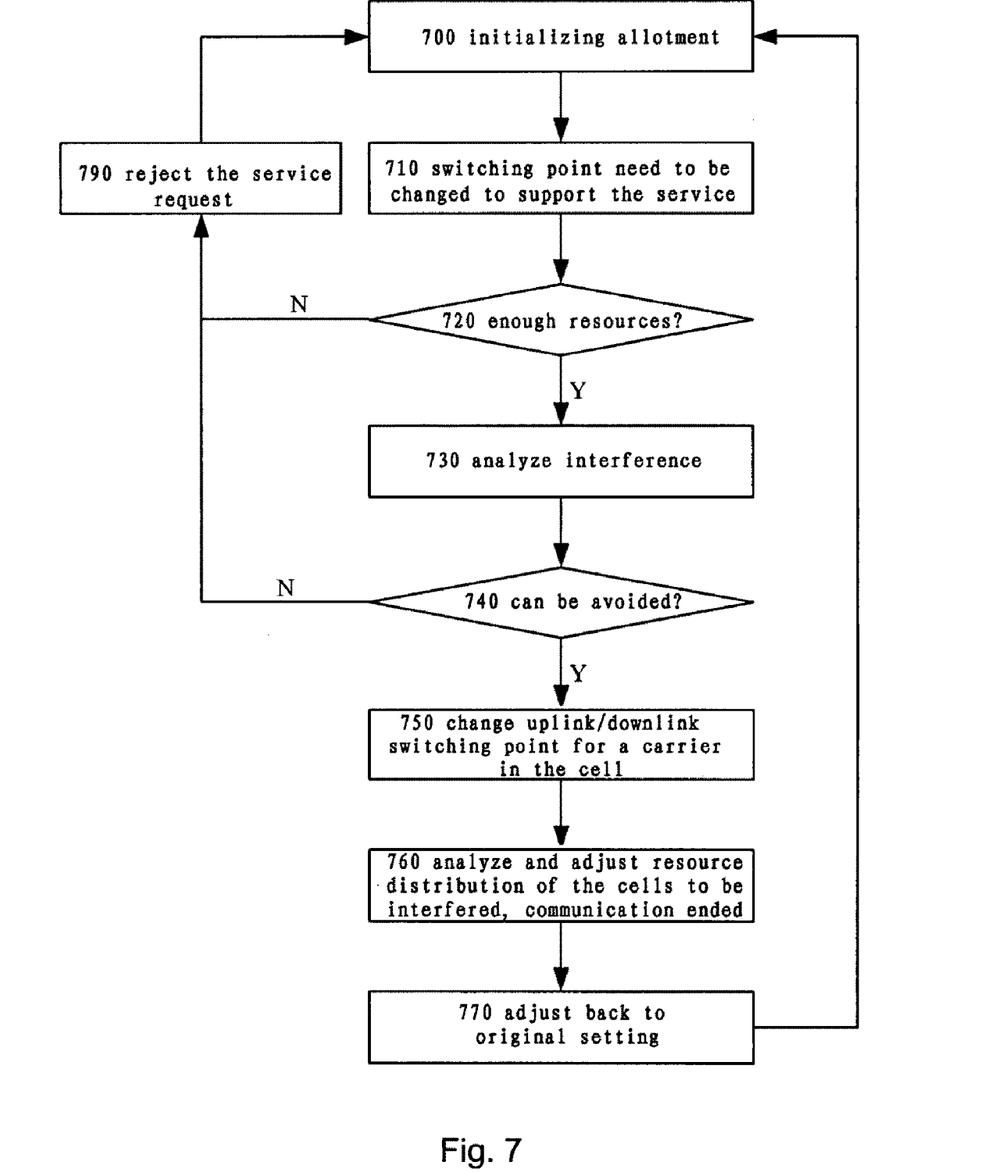
FIG. 7 is a flow chart showing the process of the radio resource control performed when different carriers of different base stations use different switching point between uplink and downlink to avoid interference.

Now, refer to FIG. 7, the radio resource management process of changing the arrangement for uplink and downlink slots to avoid the interference will be explained.

At step 700, the slot allotment for uplink and downlink services is initialized with a ratio between the uplink and downlink services. When the radio resources are allotted by the system, a ratio between the uplink and downlink services is initially set in accordance with the statistic result of the service amount for uplink and downlink, and the slots for uplink and downlink services are allotted in accordance with this ratio.

At step 710, there is a service request which requires the switching point between the uplink and downlink to be changed. When the service requirement of a call request can be supported by the original slot allotment for uplink and downlink services, the radio resources are allotted with normal method, i.e., the same the switching point between the uplink and downlink is adapted. However, when the service requirement of a call request cannot be supported by the original slot allotment for uplink and downlink services, it is further judged whether the service requirement can be supported by changing the ratio between the uplink and downlink services. There are two conditions in which the service requirement of a call request cannot be supported by the original slot allotment for uplink and downlink services, wherein the first one is that the data transmission rate required by the new service request exceeds the maximum data transmission rate achievable on that direction (uplink or downlink); and the second one is that the remaining resources are not enough to carry this new service according to the service carried by the original slot allotment for uplink and downlink services.

At step 720, it is judged if there are any resources remaining. If it is judged that the service requirement can be supported by changing the slot allotment for uplink and downlink, i.e., by changing the ratio between uplink slots and downlink slots, in other words, there is enough resources in the other transmission direction (uplink or downlink) that can support the service on this direction (uplink or downlink), the process for changing the ratio between uplink slots and downlink slots is started (step 730), otherwise, in case that the resource required by the service cannot be supported by changing the slot allotment for uplink and downlink, the service will be rejected (Step 790).

For example, when the high speed download service is requested by the user which cannot be supported by the current slot allotment for uplink and downlink, i.e., when the transmission rate of the downlink requested by the user exceeds the maximum transmission rate that can be supported by the downlink slot, or when the remaining downlink resources are not enough for supporting that required by the service requested by the user, it can be judged whether there are any resources remaining in the uplink slots to determine whether the switching point between the uplink and the downlink can be adjusted to support this service, and if there are enough resources remaining in the uplink slots which can be used to support the requested service, the interference analysis can be further performed, otherwise, the request of the user will be rejected.

At step 730, the interference which may be introduced by the adjustment of the switching point between the uplink and the downlink is analyzed. In other words, the interference of a carrier frequency with enough resources selected in the cell where the calling request has been made to the other carrier frequencies in the cell and all the carrier frequencies in the adjacent cells in the direction pointing to the user (or the interference of the other carrier frequencies in the cell and all the carrier frequencies in the adjacent cells in the direction pointing to the user to this selected carrier frequency of the cell), when the switching point thereof between the uplink and the downlink is changed is analyzed.

The rule for above analysis is to judge whether there are carrier frequencies in the adjacent cells receiving signals from terminals in the direction of this selected shaped wave packet during the uplink or downlink slots which does not belong to the originally allotted uplink or downlink slots, if yes then it is determined that the interference exists; or to judge whether there are carrier frequencies in the adjacent cells transmitting signals to terminals in the direction of this selected shaped wave packet during the uplink or downlink slots which does not belong to the originally allotted uplink or downlink slots, if yes then it is determined that the interference exists.

The above analysis is practically achieved by the management of the radio resources by the RNC. As an entity for managing and controlling the radio resources, the RNC has a system operation state database built in, wherein the state of each operating terminal within the range of management are recorded in real time, which include the radio resources allotted (such as the carrier frequency, slots and code channel), the services carried, data required to be routinely measured in accordance with the communication standard and the position of the terminal (distance and direction with respect to the base station, or the direction of its wave packet reaching the base station) or the like. Besides, the RNC also record and update the data regarding the relative positions of all the cell antennae within the range of management and the width of the shaped wave packet of each cell antenna to avoid the interference between the base stations. The RNC may refer to the related database according to the direction of the incoming wave packet of the user making the calling request, to judge if there is any interference from the other carrier frequencies in the present cell and all the carrier frequencies in the adjacent cells exists in the shaped wave packet of the user making the calling request, and may further judge if these interference can be avoided by rapid dynamic channel allotting (DCA) technology if there is any.

At step 740, it is judged whether the interference can be avoided. Here, the interference means the interference to the other carrier frequencies in the present cell and all the carrier frequencies in the adjacent cells in the direction of the user that will be introduced if the newly requested service is carried on one possible carrier frequency. If it is judged that interference exists on all possible carrier frequencies and cannot be avoided by rapid DCA, then the service request will be rejected and the step 790 will be executed; if there is no interference exists on all possible carrier frequencies, or if the interference on any of the possible carrier frequencies may be avoided by the DCA technology, step 750 is executed.

At step 750, the arrangement of the ratio between the uplink and downlink services of the selected carrier frequency is changed to support the request for high speed download service, and the database of the RNC is updated.

At step 760, the resource allotting of the interfered cells are analyzed and adjusted accordingly until the communication process is completed. Since the terminal may continuously move in the communication system, the interference will also be changed between the cells with different ratios between uplink and downlink slots. Accordingly, the change of the interference should be continuously analyzed during the entire communication process, and rapid DCA should be adapted to avoid the interference until the communication process is completed.

At step 770, when the communication is completed, the original ratio between uplink and downlink slots which has been initially set is resumed immediately.

In accordance with the present invention, different switching point for uplink and downlink can be used for different carriers and in different cells in a TDD mobile communication system operating with smart antennae, by setting up a database in the RNC, recording and updating the information regarding all the operating terminals, and by analyzing the direction of the shaped wave packet of the smart antenna, determining cells, carriers and slots that may be interfered with the information in the database and avoiding interference by means of rapid DCA technology when asymmetric services with different ratios between uplink and downlink are supported and maintained.

Determining the direction of the shaped wave packet with smart antenna technology, recording the state of the resources used by the users in the database in the RNC and DCA are commonly used technologies in the present TDD mobile communication system operating with smart antennae, and the technical solution of the present invention performs interference analysis with the information obtained with smart antenna and avoids the interference accordingly.

The base station used in the present invention must use antennae and feeding cables with enough isolation for receiving and transmission respectively, and the receiver and the transmitter must be able to be controlled separately and have enough isolation.

Since different switching point for uplink and downlink can be used for different carriers and in different cells in accordance with the present invention, the asymmetric services are supported with flexibility and the system capacity is increased.

What is claimed is:

1. A method for supporting asymmetric services in a multi-carrier time division duplex mobile communication system, configured to support asymmetric services with different switching points between downlink and uplink slots on a plurality of carrier frequencies in adjacent cells and a plurality of carrier frequencies in a same cell, said method comprising:
    A. when a ratio between uplink and downlink service slots required by a requested asymmetric service is unable to be supported by an initial ratio setting for a relating carrier frequency of a cell, determining whether the service is able to be supported by changing the ratio between uplink and downlink service slots for the carrier frequency of the cell;
    B. if the determining is positive, changing the ratio between uplink and downlink service slots for the carrier frequency of the cell, otherwise, rejecting said requested service;
    C. determining whether another service carried on a service slot of another carrier frequency of the same cell or of an adjacent cell is interfered by the changing, and adjusting, the another service carried on the service slot and determined to be interfered, to be carried on another service slot, so that the another service is not interfered by the changing.

2. The method according to claim 1, further comprising
    D. receiving uplink radio frequency signals in a uplink constituted by separate receiving antennae, feeding cables and receivers, and transmitting downlink radio frequency signals in a downlink constituted by separate transmitting antennae, feeding cables and transmitters.

3. The method according to claim 2, further comprising
    E. changing the ratio between uplink and downlink service slots for the carrier frequency back to the ratio initially set when completing the requested asymmetric service.

4. The method according to claim 1, wherein in step A, the ratio between uplink and downlink service slots required by a requested asymmetric service being unable to be supported by the ratio between uplink and downlink service slots initially set for one carrier frequency includes: a data transmission rate required by the requested service exceeding a maximum data transmission rate available in uplink or downlink of the initial setting.

5. The method according to claim 1, wherein in step A, the ratio between uplink and downlink service slots required by a requested asymmetric service being unable to be supported by the ratio between uplink and downlink service slots initially set for one carrier frequency includes: remaining resources after carrying the services under initial setting being insufficient to carry the requested service.

6. The method according to claim 1, wherein in step A, determining whether the service is able to be supported by changing the ratio between uplink and downlink service slots for the carrier frequency includes: determining whether there are sufficient resources in an opposite transmission direction that can transmit the service in a current direction.

7. The method according to claim 1, wherein the step C further comprising
    C1. selecting one carrier frequency having sufficient remaining resources in the cell where said request is being made;
    C2. determining services carried on other carrier frequencies in the cell and services carried on all the carrier frequencies in adjacent cells that will be interfered when the uplink and downlink slots arrangement for the carrier frequency is changed by analysis;
    C3. avoiding interference by adjusting the services that are determined to be interfered into other slots on its operating carrier frequency or the other carrier frequencies that will not be interfered by rapid Dynamic Channel Allotting (DCA) technology.

8. The method according to claim 7, wherein said determining by analysis in step C2 is to examine whether in a direction of shaped wave packet of a user making the request, there are said other carrier frequencies or said adjacent cells receiving signals from terminals in the direction of the shaped wave packet during slots more than the originally allotted slots.

9. The method according to claim 7, wherein said determining by analysis in step C2 is to examine whether there are said other carrier frequencies or said adjacent cells transmitting signals to terminals in the direction of the shaped wave packet during slots fewer than the originally allotted slots in the direction of the shaped wave packet.

10. The method according to claim 8, wherein said examining further comprises:
a Radio Network Controller (RNC) performing management on wireless resources by referring to the database of the operating state of the system according to direction of the incoming wave packet of the user making the calling request and width of the shaped wave packet, wherein
the database records and updates the state of each operating terminal within the management range of the RNC in real time, which includes the wireless resources allotted with carrier frequency, slots and code channel, the carried services, measured data obtained by routine measurement in accordance with communication standard, and position information of the terminals including distance and direction of the terminals with respect to base stations, and data regarding relative positions of cell antennae within management range and regarding width of the shaped wave packets of each cell antenna.

11. The method according to claim 9, wherein said examining further comprises:
a Radio Network Controller (RNC) performing management on wireless resources by referring to the database of the operating state of the system according to direction of the incoming wave packet of the user making the calling request and width of the shaped wave packet, wherein
the database records and updates the state of each operating terminal within the management range of the RNC in real time, which includes the wireless resources allotted with carrier frequency, slots and code channel, the carried services, measured data obtained by routine measurement in accordance with communication standard, and position information of the terminals including distance and direction of the terminals with respect to base stations, and data regarding relative positions of cell antennae within management range and regarding width of the shaped wave packets of each cell antenna.

12. The method according to claim 7, wherein said step C3 determines whether the interference is able to be avoided by referring to the database of the system operating state and performing management on wireless resources by a Radio Network Controller (RNC) according to the direction of the incoming wave packet of the user making the calling request and the width of the shaped wave packet, wherein
the database records and updates the state of each operating terminal within the management range of the RNC in real time, which includes the wireless resources allotted with carrier frequency, slots and code channel, the carried services, measured data obtained by routine measurement in accordance with communication standard, and position information of the terminals including distance and direction of the terminals with respect to base stations, and data regarding relative positions of cell antennae within management range and regarding width of the shaped wave packets of each cell antenna.

13. The method according to claim 1, wherein in said step B, while changing the uplink and downlink slot ratio, related information data in database of the system operating state of a Radio Network Controller (RNC) is updated.

14. The method according to claim 3, wherein in said step E, while changing the uplink and downlink slot ratio, related information data in database of the system operating state of a Radio Network Controller (RNC) is updated.

15. The method according to claim 2, wherein in said step D, isolation control is performed between the uplink and the downlink, to make the leakage from the transmitting to the receiving as low as possible; and the transmitter and the receiver are controlled separately.

* * * * *